(No Model.)

J. BELLERJEAU.
MANURE POUCH.

No. 342,171. Patented May 18, 1886.

WITNESSES:
L. Douville
W. F. Kirchers

INVENTOR:
John Bellerjeau
BY Joana Diederstein
ATTORNEY.

UNITED STATES PATENT OFFICE.

JOHN BELLERJEAU, OF PHILADELPHIA, PENNSYLVANIA.

MANURE-POUCH.

SPECIFICATION forming part of Letters Patent No. 342,171, dated May 18, 1886.

Application filed September 3, 1885. Serial No. 176,122. (No model.)

*To all whom it may concern:*

Be it known that I, JOHN BELLERJEAU, a citizen of the United States, residing in the city and county of Philadelphia, State of Pennsylvania, have invented a new and useful Improvement in Manure-Pouches, which improvement is fully set forth in the following specification and accompanying drawings, in which—

Figure 1:
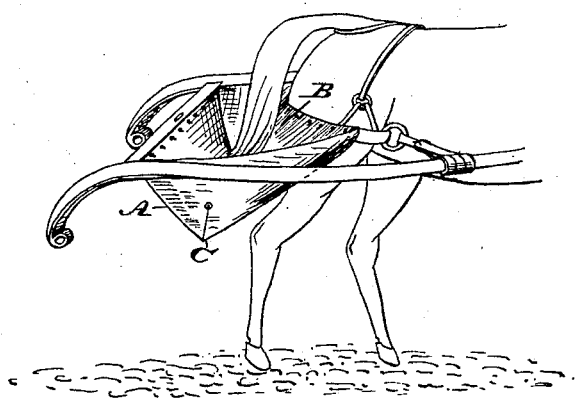
Figure 2:
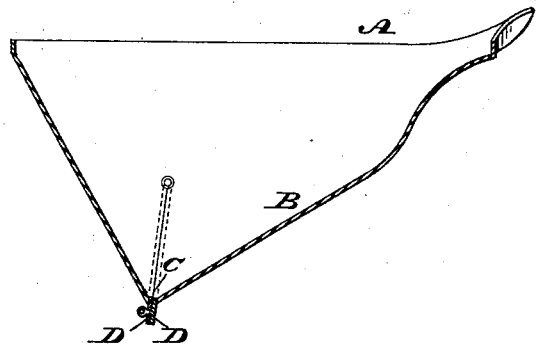
Figure 3:
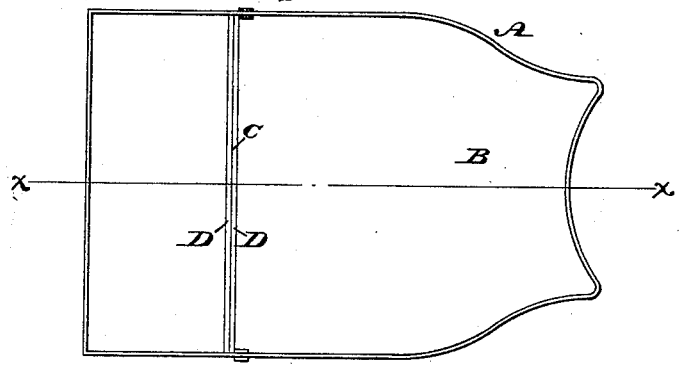

Figure 1 represents a perspective view of a device for catching animal excrement embodying my invention. Fig. 2 represents a section thereof in line $x\,x$, Fig. 3. Fig. 3 represents a top or plan view thereof on an enlarged scale.

Similar letters of reference indicate corresponding parts in the several figures.

My invention has for its object the catching or gathering of animal excrement, whereby it is prevented from fouling streets or roads, thus obviating the offensive sight, smell, unhealthiness, and expense of removal of such matter when permitted to drop as heretofore.

Referring to the drawings, A represents a pouch or bag which is secured to the harness of a horse or any suitable portion of a vehicle, so as to occupy a position at the rear of the animal. At the front portion of the pouch is an inclined side or chute, B, which leads to the pouch, and may be continuous of the adjacent part of the pouch, or a piece attached thereto, the top of the chute being close to the animal, reaching a point sufficiently below the tail thereof, or adjusted in relation thereto, that excrement will drop on the chute, and thus be directed to the pouch.

Various modes of attaching the pouch in position may be employed, some of which are as follows: The forward end may be secured to the breeching strap or band, the traces, or shafts of a vehicle, or to the breeching-strap or traces on one side and a tongue of a vehicle on the other side. The rear end may be secured to the shafts, traces, trees, or tongue, or the body of a vehicle, the attachment in any case being by means of straps and buckles, snap-hooks, buttons, or other suitable devices, so that the pouch may be removed or overturned in order to empty its contents, and for the purpose of cleansing, &c.

The bottom of the pouch has an opening, C, which is closed by jaws D, attached to the walls of the opening, adapted to be separated, so as to permit of the removal of the excrement through said opening, said jaws when closed being firmly held by catches or other fastenings.

Having thus described my invention, what I claim as new, and desire to secure by Letters Patent, is—

1. A pouch for animal excrement, having an inclined side or chute in front, an opening in its bottom, and jaws attached to the pouch controlling said opening, substantially as and for the purpose set forth.

2. A pouch for animal excrement, provided with a chute, and having an opening in the bottom, with jaws C, having fastenings D, substantially as described.

JOHN BELLERJEAU.

Witnesses:
JOHN A. WIEDERSHEIM,
W. F. KIRCHER.